Patented Sept. 5, 1933

1,926,002

UNITED STATES PATENT OFFICE 1,926,002

MANUFACTURE OF WOOD PULP

Frederick C. Hahn, Wilmington, and Robert E. Fothergill, Elsmere, Del., assignors to E. I. du Pont de Nemours & Company, Wilmington, Del., a corporation of Delaware No Drawing. Application May 2, 1931
Serial No. 534,704

6 Claims. (Cl. 92—11)

This invention relates to the production of paper pulp from wood and particularly to a process for the preparation of a useful paper pulp from wood of high resin content.

It is known that in the manufacture of the higher grades of paper from wood pulp it is necessary to obtain a strong, uncolored and easily bleachable pulp.

It is also known that in the preparation of wood pulp from highly resinous woods by means of the ordinary commercial methods, such as, for example, by the sulfite process, difficulties are encountered in obtaining a pulp of light color and easily bleached.

The outstanding disadvantage of the commercial processes for preparation of wood pulp in use at the present time consists primarily in the inability of the cooking or digesting liquors utilized to remove sufficient of the resin from highly resinous woods to give a pulp of the desired quality.

Due to the comparatively greater availability and relative cheapness of such highly resinous woods as the jack pines, (Pinus divaricata), pitch pines, (Pinus resinosa), scrub pines (Pinus virginiana), and like species which are found in abundance for example in the southern portion of the United States, a process is desirable whereby these woods can be utilized other than for the production of kraft or highly colored, difficultly bleached pulp, and a pulp can be produced which can be used for the production of superior grades of paper.

The object of this invention is to provide a process for the production of a pulp of superior quality from woods and particularly from those of high resin content.

A further object of this invention is to provide a process for the preparation of a useful pulp by the use of an ammonium bisulfite solution wherein the acidity of the solution is kept within certain specified limits.

Other objects and advantages will more fully hereinafter appear.

We have discovered that woods and particularly highly resinous woods, such as jack pine, and the like, can be made into a long-fibered, strong, wood pulp of light color and easily bleachable, by digesting the wood with an ammonium bisulfite solution, the hydrogen ion and ammonia concentration whereof are regulated within certain specified limits.

Thus, for example, we have found that chips from highly resinous and other woods, prepared according to known methods, can be digested in any of the commercial types of wood pulp cookers such, for example, as a cooker suitable for the sulfite process and a pulp prepared possessing desirable characteristics for use in the manufacture of superior types of paper, by utilizing as a cooking or digesting liquor a solution of ammonium bisulfite in which the hydrogen ion concentration is maintained above that point of acidity corresponding to a pH value of 1.7, preferably a hydrogen ion concentration corresponding to a pH value of 1.35 and in which solution the ammonia ($NH_3$) content is of a greater magnitude than 0.5%.

The solution of ammonium bisulfite can be prepared in any known manner, such as by bubbling gaseous ammonia and sulfur dioxide into water, either before or after the introduction of the wood chips or by bubbling sulfur dioxide up through a suitable tower counter-current to a solution of ammonium hydroxide or ammonium carbonate, but according to the preferred form of this invention we prepare a solution of ammonium bisulfite by bubbling ammonia ($NH_3$) and sulfur dioxide ($SO_2$) into water so that there will be obtained a solution having a hydrogen ion concentration greater than 0.02 mols hydrogen ion per liter and having a pH value of less than 1.7, and into this digesting liquor, contained in a cooker suitable for the preparation of wood pulp, we introduce the desired quantity of wood chips, such, for example, as jack pine.

By maintaining the ammonium bisulfite liquor at a hydrogen ion concentration corresponding to a pH value of less than 1.7, as above described, and at the same time regulating the ammonia concentration to an amount greater than 0.5%, we are able, according to the present invention, to obtain a light colored, easily bleachable pulp which is suitable for the manufacture of a high grade paper of superior quality.

Specifically our process comprises first preparing the fibrous materials in a suitable comminuted form, for example, chipping the wood to the desired form in a mechanical chipper and thereafter charging the comminuted fibrous material into a digester of any suitable type, such as, for example, a steel digester lined with lead and with an inner layer of hard burned acid resisting brick, set preferably in cement. The requisite amount of ammonium bisulfite liquor is led into the digester and the temperature raised, by the admission of steam or otherwise, to the neighborhood of 110° C. in 2-3 hours. The temperature is then further raised in 3-9 hours to about 150° C. to 160° C. and is maintained at this point from ½ to 2 hours. The time and temperature of the preliminary and final digesting will be regulated by the type and grade of resinous fibrous material being treated but will approximate closely the conditions described when using the ordinary jack pine or pinus divaricata variety. Upon the completion of the cooking the pulp and "black liquor" are blown out, the pulp separated and washed of the black liquor, and thereafter the black liquor treated for recovery of the reagents as hereinafter described.

For most foods the amount of liquor to chips is generally from 4–8 parts by weight of liquor to 1 part of chips. The concentration of the sulfur dioxide in the liquor will vary over a comparatively wide range and will be determined by the resin content of the wood treated but generally will be below 7% and above 3% while at the same time the concentration of ammonia will be between 0.5% and 1%, thus maintaining an acidity of solution corresponding to a hydrogen ion concentration value of from $pH=1$ to $pH=1.7$.

A highly resinous wood treated according to this invention will give a wood pulp of excellent quality, whereas the same wood treated by the usual calcium bisulfite process will give a coarse, brackish, highly colored pulp containing a high percentage of shives and partially reduced ligneous particles entirely unsuitable for the preparation of high grade or white papers.

Although the details and methods of carrying out the invention may be varied within wide limits without departing from the invention or sacrificing any of the advantages thereof, the following example will serve to indicate the preferred embodiments and methods of procedure for executing the invention.

*Example.*—20 parts by weight of jack pine are introduced into a chipping machine which produces wood fragments of about ⅜ to 1" in length by ⅛ to ¼" in thickness. The chips thus obtained are charged into a digester containing an ammonium bisulfite solution of a hydrogen ion concentration of 0.05 mols per liter. The ammonium bisulfite solution described is prepared by adding 0.62 parts of $NH_3$ by weight and 5.7 parts of $SO_2$ to 93.68 parts of $H_2O$ to thus obtain a hydrogen ion concentration corresponding to a value of $pH=1.35$ and at the same time an ammonia concentration of 0.62%. Steam is then injected into the digester and the temperature raised to 110° C. in 2–3 hours. Thereafter the temperature is raised in 6–8 hours to about 150° C. and the digestion carried out at approximately this temperature for one hour. The length of treatment with the digesting liquor is dependent upon the temperature utilized, the higher the temperature the shorter the time of digestion necessary. Upon the completion of the final digesting the pulp and "black liquor" are blown from the digester and the pulp washed free from the black liquors.

By conducting the digestion as above described, we obtain a light colored, strong, easily bleachable pulp, whereas by use of a calcium and magnesium bisulfite solution the jack pine pulp is found to be highly colored and unfitted for commercial uses and, furthermore, if sufficiently bleached by digestion for a greater length of time to give the desired absence of color, the fibres are so short that the paper prepared therefrom is weak and of insufficient strength for utilization in manufacture of high grade paper.

The "black liquor", containing ammonium bisulfite, may be treated by various well known methods for the recovery of the ammonia and sulfur dioxide. Thus, for example, the "black liquor" may be treated for the removal of the free $SO_2$ and then lime added to displace the $NH_3$ which may be driven off and recovered by heating the solution or by other suitable means such as distillation. The lime will also remove the excess sulfite by precipitation as calcium sulfite.

Various changes may be made in the method described without departing from the invention or sacrificing any of the advantages thereof.

We claim:

1. A process for the manufacture of paper pulp which comprises digesting wood with an ammonium bisulfite solution of hydrogen ion concentration such that the pH value is in the range of from about $pH=1$ to $pH=1.7$ and the ammonia concentration from above 0.5% to 1%.

2. A process for the manufacture of paper pulp which comprises digesting jack pine wood with an ammonium bisulfite solution of hydrogen ion concentration such that the pH value is in the range of from about $pH=1$ to $pH=1.7$ and ammonia concentration from above 0.5% to 1%.

3. A process for the manufacture of paper pulp which comprises digesting wood with an ammonium bisulfite solution of hydrogen ion concentration such that the pH value is substantially $pH=1.35$ and the ammonia concentration is substantially 0.65%.

4. A process for the manufacture of paper pulp which comprises digesting jack pine with an ammonium bisulfite solution of hydrogen ion concentration such that the pH value is substantially $pH=1.35$.

5. A process for the manufacture of paper pulp which comprises digesting jack pine with an ammonium bisulfite solution of hydrogen ion concentration such that the pH value is substantially $pH=1.35$ and the ammonia concentration is substantially 0.65%.

6. A process for the manufacture of paper pulp which comprises digesting highly resinous wood with an ammonium bisulfite solution of hydrogen ion concentration such that the pH value is substantially $pH=1.35$ and the ammonia concentration is substantially 0.65%.

FREDERICK C. HAHN.
ROBERT E. FOTHERGILL.